United States Patent
Pakniat et al.

(10) Patent No.: US 11,917,470 B2
(45) Date of Patent: *Feb. 27, 2024

(54) PROVISION OF INSTRUCTIONS RELATED TO MEASUREMENTS BY A WIRELESS COMMUNICATION DEVICE ON A SIGNAL FROM A WIRELESS COMMUNICATION NETWORK

(71) Applicant: TELEFONAKTIEBOLAGET LM ERICSSON (PUBL), Stockholm (SE)

(72) Inventors: Parisa Pakniat, Solna (SE); Henning Wiemann, Aachen (DE); Icaro L. J. Da Silva, Solna (SE); Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1 day.

This patent is subject to a terminal disclaimer.

(21) Appl. No.: 17/726,901

(22) Filed: Apr. 22, 2022

(65) Prior Publication Data
US 2022/0248283 A1  Aug. 4, 2022

Related U.S. Application Data

(63) Continuation of application No. 16/637,535, filed as application No. PCT/SE2018/050814 on Aug. 10, 2018, now Pat. No. 11,317,328.

(Continued)

(51) Int. Cl.
*H04W 36/00* (2009.01)
*H04L 5/00* (2006.01)
(Continued)

(52) U.S. Cl.
CPC ....... *H04W 36/0094* (2013.01); *H04L 5/0048* (2013.01); *H04W 24/10* (2013.01);
(Continued)

(58) Field of Classification Search
CPC ....... H04W 36/0094; H04W 36/00837; H04W 36/30; H04W 36/0088; H04W 24/10; H04L 5/0048
(Continued)

(56) References Cited

U.S. PATENT DOCUMENTS 9,596,616 B2 *  3/2017  Jang ............ H04W 24/08
9,930,559 B2    3/2018  Kusashima
(Continued)

FOREIGN PATENT DOCUMENTS

CN   105144614 B   5/2018
CN   105940708 B   2/2020
(Continued)

OTHER PUBLICATIONS

3GPP TS 36.331 V12.2.0 (Jun. 2014), 3rd Generation Partnership Project; Technical Specification Group Radio Access Network; Evolved Universal Terrestrial Radio Access (E-UTRA); Radio Resource Control (RRC); Protocol specification (Release 12).
(Continued)

*Primary Examiner* — Mong-Thuy T Tran

(57) ABSTRACT

A system (300) of a wireless communication network (100) comprising a first network node (110) arranged for wireless communication with a wireless communication device (130). A message is triggered to be sent from the first network node (110) to and received by the wireless communication device (130). The message comprises instructions related to measurements by the wireless communication device (130) on a signal from a network node (110; 120) of the wireless communication network (100). The instructions comprising a first measurement condition and a second measurement condition and that both the first measurement condition and the second measurement condition have to be fulfilled for the wireless communication device (130) to (Continued)

report at least one of the measurements to the wireless communication network (100).

17 Claims, 3 Drawing Sheets

Related U.S. Application Data

(60) Provisional application No. 62/544,205, filed on Aug. 11, 2017.

(51) Int. Cl.
*H04W 24/10* (2009.01)
*H04W 36/30* (2009.01)

(52) U.S. Cl.
CPC ............ *H04W 36/0088* (2013.01); *H04W 36/00837* (2018.08); *H04W 36/30* (2013.01)

(58) Field of Classification Search
USPC ...................................................... 455/419
See application file for complete search history.

(56) References Cited

U.S. PATENT DOCUMENTS

| | | | |
|---|---|---|---|
| 11,317,328 B2 * | 4/2022 | Pakniat | H04W 36/0085 |
| 11,350,321 B2 * | 5/2022 | Yang | H04W 76/27 |
| 11,464,063 B2 * | 10/2022 | Li | H04W 24/10 |
| 2013/0077513 A1 | 3/2013 | Ng et al. | |
| 2013/0260741 A1 | 10/2013 | Yamada | |
| 2014/0213255 A1 | 7/2014 | Müller | |
| 2014/0355568 A1 * | 12/2014 | Gunnarsson | H04W 36/0094 370/329 |
| 2014/0357274 A1 | 12/2014 | Teng | |
| 2015/0092578 A1 | 4/2015 | Ingale | |
| 2015/0271713 A1 * | 9/2015 | Kim | H04W 76/15 455/437 |
| 2015/0312788 A1 | 10/2015 | Delsol | |
| 2015/0327097 A1 | 11/2015 | Chai | |
| 2016/0021695 A1 | 1/2016 | Axmon | |
| 2016/0044569 A1 * | 2/2016 | Lunden | H04W 36/0058 370/331 |
| 2016/0219473 A1 * | 7/2016 | Teyeb | H04W 36/22 |
| 2017/0150385 A1 * | 5/2017 | Henttonen | H04W 24/02 |
| 2018/0124766 A1 | 5/2018 | Nagaraja | |
| 2018/0139030 A1 | 5/2018 | Kim | |
| 2018/0192426 A1 | 7/2018 | Ryoo | |
| 2018/0199226 A1 | 7/2018 | Tsai | |
| 2018/0352467 A1 * | 12/2018 | Delsol | H04W 36/0094 |
| 2019/0053072 A1 | 2/2019 | Kundargi | |
| 2019/0357069 A1 | 11/2019 | Harada | |
| 2020/0015107 A1 * | 1/2020 | Takahashi | H04W 36/0058 |
| 2020/0029262 A1 | 1/2020 | Kim et al. | |
| 2020/0162953 A1 * | 5/2020 | Kim | H04L 5/0051 |

FOREIGN PATENT DOCUMENTS

| | | |
|---|---|---|
| CN | 106664171 B | 3/2020 |
| CN | 106576265 B | 9/2020 |
| GB | 2509749 A | 7/2014 |
| JP | 2017513295 A | 5/2017 |
| RU | 2015134563 A | 2/2017 |
| WO | 2011130989 A1 | 10/2011 |
| WO | 2013027993 A2 | 2/2013 |
| WO | 2014096532 A1 | 6/2014 |
| WO | 2014111463 A1 | 7/2014 |
| WO | 2014116154 A1 | 7/2014 |
| WO | 2014142725 A1 | 9/2014 |
| WO | 2015043504 A1 | 4/2015 |
| WO | 2015141825 A1 | 9/2015 |
| WO | 2015169391 A1 | 11/2015 |
| WO | 2016093753 A1 | 6/2016 |
| WO | 2018128186 A1 | 7/2018 |

OTHER PUBLICATIONS

3GPP TS 38.331 V0.0.4, 3rd Generation Partnership Project; Technical Specification Group Radio Access Network; NR; Radio Resource Control (RRC); Protocol specification (Release 15), Jun. 2017, 22 pages.

3GPP, 3rd Generation Partnership Project; Technical Specification Group Radio Access Network; Evolved Universal Terrestrial Radio Access (E-UTRA); Radio Resource Control (RRC); Protocol specification (Release 14), TS 36.331 V14.3.0, Jun. 2017.

Huawei et al., Introduction of Licensed-Assisted Access using LTE, R2-156917, 3GPP TSG-RAN WG2 Meeting #92, Anaheim, USA, Nov. 16-20, 2015, 49 pages.

Huawei et al., Measurement and Mobility in high frequency, R2-168255, 3GPP TSG-RAN2 Meeting #96, Reno, Nevada, USA, Nov. 14-18, 2016, 4 pages.

Huawei et al., Measurement reporting for NR SS and CSI-RS, R2-1706729, 3GPP TSG-RAN WG2 NR AdHoc #2, Qingdao, China, Jun. 27-29, 2017, 3 pages.

Nokia et al., Consistent viewpoint on Measurement Model for NR, 3GPP TSG-RAN WG2 NR Adhoc #2, R2-1706486, Qingdao, China, Jun. 27-29, 2017.

Nokia et al., Mobility Measurements in Connected Mode, R2-1705396, 3GPP TSG-RAN WG2 Meeting #98, Hangzhou, China, May 15-19, 2017, 6 pages.

Samsung, Identities of the NR-SS and CSI-RS for RRM Measurement , 3GPP TSG-RAN WG2 2017 RAN2 Ad-hoc Meeting, R2-1707309, Qingdao, China, Jun. 27-29, 2017.

\* cited by examiner

PROVISION OF INSTRUCTIONS RELATED TO MEASUREMENTS BY A WIRELESS COMMUNICATION DEVICE ON A SIGNAL FROM A WIRELESS COMMUNICATION NETWORK

CROSS REFERENCE TO RELATED APPLICATIONS

This application is a continuation of U.S. patent application Ser. No. 16/637,535, filed Feb. 7, 2020, which is a 35 U.S.C. § 371 national phase application of International Application No. PCT/SE2018/050814, filed Aug. 10, 2018, the content of which is incorporated herein by reference in its entirety, which claims the benefit of U.S. Provisional Application, Ser. No. 62/544,205, filed Aug. 11, 2017, entitled Methods and Apparatus for Controlling Measurement Reporting in a Wireless Communications Network.

TECHNICAL FIELD

Embodiments herein relate to methods and arrangements, such as a system of a wireless communication network and a wireless communication device. More particularly embodiments herein relate to provision of a message with instructions related to measurements by the wireless communication device on a signal received by the wireless communication device from a network node of the wireless communication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, that alternatively e.g. may be named cellular communication network, wireless communication system, radio communication system, cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user. The wireless device may be, for example, portable, pocket-storable, hand-held, computer-comprised, or vehicle-mounted mobile device, enabled to communicate voice and/or data, via the RAN, with another entity, such as another wireless device or a server. The wireless communication network covers a geographical area in which radio coverage is provided and enables wireless devices to connect and communicate in the network. The area may be divided into subareas, e.g. cell areas, wherein each subarea is served by at least one base station, or Base Station (BS), e.g. a Radio Base Station (RBS), which sometimes may be referred to as e.g. "eNB", "eNodeB", "NodeB", "B node", or BTS (Base Transceiver Station), gNB, depending on the technology and terminology used. The base stations may be of different classes such as e.g. macro eNodeB, home eNodeB or pico base station, based on transmission power and thereby also cell size. The base station at a base station site typically provides radio coverage for one or more cells. A cell is typically identified by one or more cell identities and may be associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

The expression downlink (DL) is used for the transmission path from the base station to the wireless device. The expression uplink (UL) is used for the transmission path in the opposite direction i.e. from the wireless device to the base station.

UMTS is a 3G, or third generation, mobile communication system, which evolved from Global System for Mobile communications (GSM) that belongs to the so called 2nd generation or 2G. UMTS provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3G mobile telecommunication networks utilizing the WCDMA. Such networks may be named WCDMA/HSPA.

The 3rd Generation Partnership Project (3GPP) has further evolved the UTRAN and GSM based radio access network technologies, for example into Evolved UTRAN (EUTRAN) used in Long Term Evolution (LTE) that is a 4G, i.e. $4^{th}$ generation, mobile communication system.

3GPP is also involved in standardizing another new generation wide area networks, which may be referred to as fifth generation (5G). 5G New Radio (5G NR), or simply NR, is the new radio air interface being developed for 5G. However, NR may also be used to denote 5G in general. Another acronym being used to denote 5G is Next Generation (NG).

In wireless communication networks, UE measurements are used to monitor and report the serving cell and neighboring cell(s) signal level and quality to assist the radio network to choose a suitable serving cell for the UE. There are different reasons to relocate a UE from a current serving cell to another cell, such as coverage reasons, traffic load level or support of a specific service.

UE measurements are configured by the radio network, also called wireless communication network, and several parameters are involved to specify the conditions for measurements and reporting.

In LTE, UE measurement configurations provided by the EUTRAN, i.e. the radio network, to a UE are specified in the 3GPP Technical Specification (TS) 36.331 EUTRA Radio Resource Control (RRC) Protocol Specification, see e.g.

V14.3.0 (2017-06). A corresponding specification, 3GPP TS 38.331 NR RRC Protocol Specification, see e.g. V0.0.4, is under development for NR which is expected to be partly similar to the EUTRAN version where applicable. For both specifications, see particularly chapters 5.5 and 6.3. The measurement configuration framework in NR will be based on the framework from LTE, as described in said 3GPP TS 38.331. In NR, the network can configure a so called RRC_CONNECTED UE to perform cell level and beam level measurements and report them in accordance with the measurement configuration. The measurement configuration is provided by means of dedicated signaling. The measurement configuration may be provided to the UE via RRC messages such as RRCConnectionReconfiguration and/or RRCConnectionResume.

The radio network can configure the UE to perform the following types of measurements:

Intra-frequency measurements: measurements at the downlink carrier frequency/frequencies of the serving cell/cells.

Inter-frequency measurements: measurements at frequencies that differ from any of the downlink carrier frequency/frequencies of the serving cell/cells.

Inter Radio Access Technology (inter-Rat or IRAT) measurements of EUTRA frequencies.

An RRC_CONNECTED UE in NR can be configured to perform UTRA measurements, GSM measurements and/or non-3GPP IRAT measurements, such as Wireless Local Area Network (WLAN) Code Division Multiple Access 2000 (CDMA2000), etc. The measurement configuration includes the following parameters:

1. Measurement objects: A list of objects on which the UE shall perform the measurements.

For intra-frequency and inter-frequency measurements a measurement object is associated to an NR downlink carrier frequency. Associated with this carrier frequency, the network can configure a list of 'blacklisted' cells and a list of 'whitelisted' cells. Blacklisted cells are not applicable in event evaluation or measurement reporting. Whitelisted cells are the only ones applicable in event evaluation and/or measurement reporting.

For inter-RAT E-UTRA measurements a measurement object is a single E-UTRA downlink carrier frequency.

2. Reporting configurations: A list of reporting configurations where there can be one or multiple reporting configurations per measurement object. Each reporting configuration comprises the following:

Reporting criterion: The criterion that triggers the UE to send a measurement report which can either be event triggered or periodical. The criterion also includes a trigger quantity, such as Reference Signal Received Power (RSRP), Reference Signal Received Quality (RSRQ) or Signal to Interference and Noise Ratio (SINR).

Reference Signal (RS) type: The RS to be considered by the UE for cell level and beam level measurements, such as New Radio Synchronization Signal (NR-SS) or Channel State Information Reference Signal (CSI-RS).

There is a new aspect in NR that cell quality can be computed based on two types of RSs, NR-SS, basically NR-Primary SS (NR-PSS) and/or NR-Secondary SS (NR-SSS) and CSI-RS.

Reporting format: The cell level and beam level quantities that the UE includes in the measurement report, e.g. RSRP and/or RSRQ and/or SINR, and associated information, e.g. number of cells and/or beams to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: One quantity configuration is configured per RAT type. The quantity configuration defines the measurement quantities and associated filtering used for all event evaluation and related reporting of that measurement type.

5. Measurement gaps: Periods that the UE may use to perform measurements, i.e. no (uplink, UL, downlink, DL) transmissions are scheduled.

SUMMARY

In view of the above, an object to improve or enable improvements regarding reporting by a wireless communication device, e.g. a UE, to the wireless communication network of measurements performed by the wireless device. The improvements may e.g. be to enable to send more accurate measurement result from the UE to the wireless communication network, for example discard sending measurements that are not of interest for the network and/or to reduce signaling for sending measurements from the UE to the wireless communication network compared to prior art.

According to a first aspect of embodiments herein, the object is achieved by a method performed by a system of a wireless communication network. The wireless communication network comprises a first network node arranged for wireless communication with a wireless communication device. The system triggers sending of a message from the first network node to the wireless communication device. The message comprises instructions related to measurements by the wireless communication device on a signal received by the wireless communication device from a network node of the wireless communication network. The instructions comprise a first measurement condition and a second measurement condition where both the first measurement condition and the second measurement condition have to be fulfilled for the wireless communication device to report at least one of the measurements to the wireless communication network.

According to a second aspect of embodiments herein, the object is achieved by a system of a wireless communication network. The wireless communication network comprises a first network node arranged for wireless communication with a wireless communication device. The system is configured to trigger sending of a message from the first network node to the wireless communication device. The message comprises instructions related to measurements by the wireless communication device on a signal received by the wireless communication device from a network node of the wireless communication network. The instructions comprise a first measurement condition and a second measurement condition where both the first measurement condition and the second measurement condition have to be fulfilled for the wireless communication device to report at least one of the measurements to the wireless communication network.

According to a third aspect of embodiments herein, the object is achieved by a method performed by a by a wireless communication device wirelessly connected to a first network node of a wireless communication network. The wireless communication device receives a message from the first network node, which message comprises instructions related to at least one measurement by the wireless communication device on a signal received by the wireless communication device from a network node of the wireless communication network. The instructions comprise a first measurement condition and a second measurement condition where both the first measurement condition and the second measurement condition have to be fulfilled for the wireless communication device to report the at least one measurement to the wireless communication network. The wireless communication device performs the at least one measurement on the signal received from the network node. The wireless communication device reports the at least one measurement to the wireless communication network based on whether the at least one measurement fulfils the first measurement condition and the second measurement condition.

According to a fourth aspect of embodiments herein, the object is achieved by a wireless communication device wirelessly configured to wirelessly connected to a first network node of a wireless communication network. The wireless communication device is configured to receive a message from the first network node, which message comprises instructions related to at least one measurement by the wireless communication device on a signal received by the wireless communication device from a network node of the wireless communication network. The instructions comprise a first measurement condition and a second measurement condition where both the first measurement condition and the second measurement condition have to be fulfilled for the wireless communication device to report the at least one measurement to the wireless communication network. The wireless communication device is further configured to perform the at least one measurement on the signal received from the network node. Moreover, the wireless communication device is configured to report the at least one measurement to the wireless communication network based on whether the at least one measurement fulfils the first measurement condition and the second measurement condition.

Thanks to the above and embodiments herein, the system and thus the wireless communication network are enabled to instruct the wireless communication device to take two or even more measurement conditions into consideration when determining whether to send, such as report, one or more measurements to the network node. Thereby it e.g. becomes possible to determine with greater precision whether a measurement is of value for the network node, when e.g. deciding whether to perform handover of the wireless communication device from the first network node to the second network node. In other words, embodiments herein enable improvements regarding reporting by a wireless communication device to the wireless communication network of measurements performed by the wireless communication device.

BRIEF DESCRIPTION OF THE DRAWINGS

For a more complete understanding of the embodiments and their features and advantages, reference is now made to the following description, taken in conjunction with the accompanying drawings, which are briefly described in the following.

DETAILED DESCRIPTION

Figure 1:
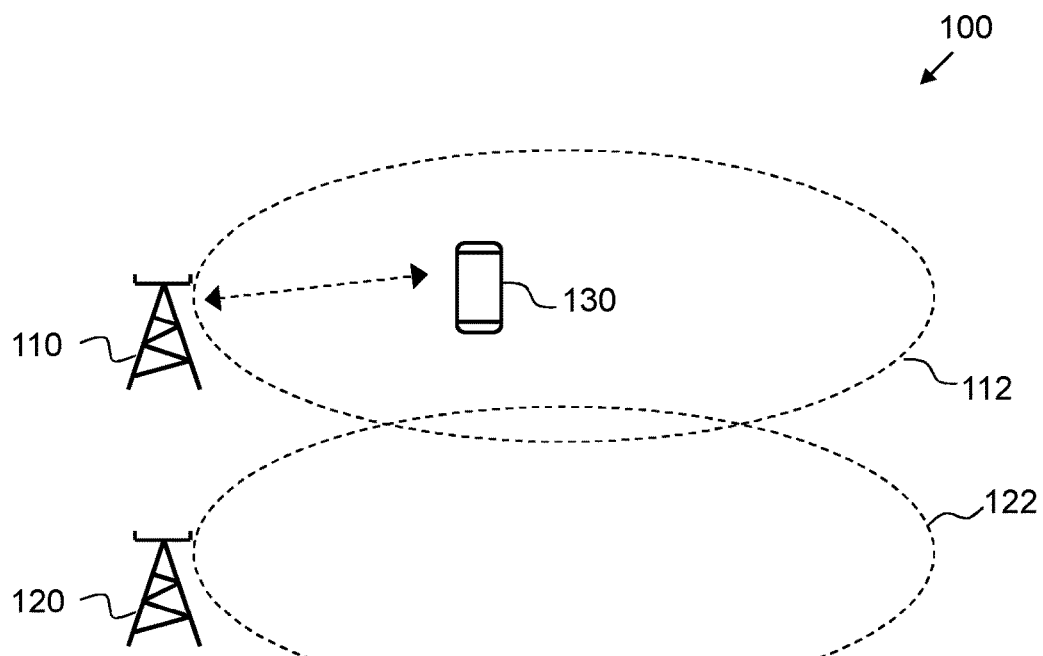
FIG. 1 is a block diagram schematically illustrating a wireless communication network.

FIG. 1 is a block diagram schematically illustrating a wireless communication network 100 being an exemplary wireless communication network in which embodiments herein may be implemented. The wireless communications network 100 may be a wireless communications network such as an NR, LTE, LTE-Advanced, Wideband CDMA, GSM, CDMA2000 or WLAN, or any other similar cellular network or system.

The wireless communications network 100 comprises a first network node 110 and a second network node 120. The first network node 110 serves a first cell 112 and the second network node serves a second cell 122. The first and second network nodes 110, 120 may be base stations, radio base stations, nodeBs, eNodeBs, eNBs, gNBs, Home Node Bs, Home eNode Bs, or any other network unit capable of communicating with wireless communication devices, e.g. UEs, within the cell served by the network node depending e.g. on the radio access technology and terminology used. The first and second network nodes 110, 120 may alternatively be base station controllers, network controllers, relay nodes, repeaters, access points, radio access points, Remote Radio Units (RRUs) or Remote Radio Heads (RRHs).

Similar as already discussed above, a cell may correspond to a geographical area where radio coverage is provided by radio base station equipment at a base station site or at remote locations in RRUs. The cell definition may also incorporate frequency bands and radio access technology, i.e. RAT, used for transmissions, which means that two different cells may cover the same geographical area but using different frequency bands. The first and second network nodes 110, 130 may thus be arranged to communicate over the air or radio interface operating on radio frequencies with wireless devices within range of the respective network node.

In FIG. 1, a wireless communication device 130 is shown located within the first cell 112. The wireless communication device 130 may herein and in the following be named a UE. The wireless communication device 130 may be configured to communicate within the wireless communication network 100 via the first network node 110 over a radio link when present in the first cell 112 served by the first network node 110. The first network node 110 may be called a serving network node to the wireless communication device 130 when it provides wireless communication access to the wireless communication device 130. The second network node 120 may be called a neighbor network node to the wireless communication device 130 when the wireless communication device 130 is in the first cell 112 and the wireless communication device 130 can receive signals from the second network node 120. The wireless communication device 130 may e.g. be any kind of wireless device such as a mobile phone, cellular phone, Personal Digital Assistants, PDA, a smart phone, tablet, sensor equipped with wireless communication abilities, Laptop Mounted Equipment, LME, e.g. USB, Laptop Embedded Equipment, LEE, Machine Type Communication, MTC, device, Machine to Machine, M2M, device, or Customer Premises Equipment, CPEs, etc.

Attention is drawn to that FIG. 1 is only schematic and for exemplifying purpose and that not everything shown in the figure may be required for all embodiments herein, as should be evident to the skilled person. Also, a wireless communication network or networks that correspond(s) to the wireless communication network 100, will typically comprise several further network nodes, such as further radio network nodes, e.g. base stations, network nodes, e.g. both radio and core network nodes, etc., as realized by the skilled person, but which are not shown herein for the sake of simplifying.

As a development towards embodiments herein, the situation indicated in the Background will first be further elaborated upon.

According to the specification TS 36.331 V14.3.0 (2017-06), as mentioned above, i.e. for LTE, the reporting criterion, i.e. whether to report measurements performed by a UE on a signal from a network node or not, is limited to only one measurement quantity, also known as trigger quantity, e.g. RSRP, RSRQ or SINR in EUTRAN measurements. In the specification it is stated "Reporting criterion: The criterion that triggers the UE to send a measurement report which can either be event triggered or periodical. The criterion also includes a trigger quantity (RSRP, RSRQ or SINR)."

The purpose of measurements in most cases is to find a suitable handover target cell to move the UE to. It has been determined that in many cases, for the best performance of the UE, both signal level and quality should be good or even better in the criterion depending on scenario and measurement event. This is not possible to accomplish in the existing technology in a combined (single) measurement. In order to have such double, or multiple, check in the existing technology, the network node, e.g. eNB has to either configure separate measurements and/or perform additional post processing on the reported measurement to evaluate if a target is good enough for a specific mobility purpose. These both alternatives imply extra RRC signaling, longer handover decision time, increased UE battery consumption and more complicated procedures in the eNB. The same is expected to be the case for NR and in a gNB.

Besides, in NR there are two different RS types, NR-SS and CSI-RS as mentioned above, for measurements. Having only one trigger quantity per event implies limitations on event measurements to be based on only one of the RS types.

The text below in italic is procedural text for an Event A5, copied from chapter 5.5.4.6 of the E-UTRA specification 3GPP TS 36.331 V14.3.0 (2017-06) mentioned above, provided here as an example. It is similar to other event measurements. An event, also known as an event measurement, can be understood as an event where measurements on a signal are to be reported when the conditions of the event are fulfilled.

5.5.4.6 Event A5 (Primary Cell/Primary Secondary Cell, PCell/PSCell, Becomes Worse than Threshold1 and Neighbour Cell Becomes Better than Threshold2)

The UE shall:

1> consider the entering condition for this event to be satisfied when both condition A5-1 and condition A5-2, as specified below, are fulfilled;

1> consider the leaving condition for this event to be satisfied when condition A5-3 or condition A5-4, i.e. at least one of the two, as specified below, is fulfilled;

1> if usePSCell of the corresponding reportConfig is set to true:

2> use the PSCell for Mp;

1> else:

2> use the PCell for Mp;

NOTE: The cell(s) that triggers the event is on the frequency indicated in the associated measObject which may be different from the frequency used by the PCell/PSCell.

$Mp+Hys < Thresh1$     Inequality A5-1 (Entering condition 1)

$Mn+Ofn+Ocn-Hys > Thresh2$     Inequality A5-2 (Entering condition 2)

$Mp-Hys > Thresh1$     Inequality A5-3 (Leaving condition 1)

$Mn+Ofn+Ocn+Hys < Thresh2$     Inequality A5-4 (Leaving condition 2)

The variables in the formula are defined as follows:

Mp is the measurement result of the PCell/PSCell, not taking into account any offsets.

Mn is the measurement result of the neighbouring cell, not taking into account any offsets.

Ofn is the frequency specific offset of the frequency of the neighbour cell (i.e. offsetFreq as defined within measObjectEUTRA corresponding to the frequency of the neighbour cell).

Ocn is the cell specific offset of the neighbour cell (i.e. cellIndividualOffset as defined within measObjectEUTRA corresponding to the frequency of the neighbour cell), and set to zero if not configured for the neighbour cell.

Hys is the hysteresis parameter for this event (i.e. hysteresis as defined within reportConfigEUTRA for this event).

Thresh1 is the threshold parameter for this event (i.e. a5-Threshold1 as defined within reportConfigEUTRA for this event).

Thresh2 is the threshold parameter for this event (i.e. a5-Threshold2 as defined within reportConfigEUTRA for this event).

Mn, Mp are expressed in dBm in case of RSRP, or in dB in case of RSRQ and RS-SINR.

Ofn, Ocn, Hys are expressed in dB.

Thresh1 is expressed in the same unit as Mp.

Thresh2 is expressed in the same unit as Mn.

Furthermore, Table 1 below contains extract from the ReportConfigEUTRA information element as defined in said TS 36.331 V14.3.0 (2017-06), see pages 488-491. The extract concerns the trigger quantity configuration.

TABLE 1

| Extract from ReportConfigEUTRA information element | | | |
|---|---|---|---|
| triggerQuantity | ENUMERATED {rsrp, rsrq}, | | |
| rs-sinr-Config-r13 | CHOICE { | | |
|   release |   NULL, | | |
|   setup |   SEQUENCE { | | |
|     triggerQuantity-v1310 |     ENUMERATED {sinr} | OPTIONAL, | -- Need ON |
|     aN-Threshold1-r13 |     RS-SINR-Range-r13 | OPTIONAL, | -- Need ON |
|     a5-Threshold2-r13 |     RS-SINR-Range-r13 | OPTIONAL, | -- Need ON |
|     reportQuantity-v1310 |     ENUMERATED {rsrpANDsinr, rsrqANDsinr, all} | | |

In said specification triggerQuantity is explained as "The quantity used to evaluate the triggering condition for the event concerning CRS. EUTRAN sets the value according to the quantity of the ThresholdEUTRA for this event. The values rsrp, rsrq and sinr correspond to Reference Signal Received Power (RSRP), Reference Signal Received Quality (RSRQ) and Reference Signal to Interference and Noise Ratio (RS-SINR), see TS 36.214. If triggerQuantity-v1310 is configured, the UE only considers this extension (and ignores triggerQuantity i.e. without suffix)."

Embodiments herein may be considered to relate to, and can be implemented by, extending or adapting the measurement configuration, e.g. signaled by the first network node 110 to the wireless communication device 130, i.e. measurement instructions related to UE measurements on signals received by the UE from one or more network nodes, and also to improve handling in the wireless communication device 130, i.e. UE implementation, to make it possible to have double/multiple triggers, which also may be known as fulfilled measurement conditions, for measurement performing and reporting.

In some embodiments, the multiple trigger conditions, also known as measurement conditions, are associated to multiple trigger quantities, e.g. different RSRP, RSRQ and SINR. In that case, embodiments herein make it possible for the wireless communication network 100 to define more than one triggering quantity for each measurement event, which can be defined per reportConfig, i.e. within the same reportConfig, such as in the same reportConfig IE. As indicated above, in the prior art, the network can only configure one single quantity per event within reportConfig. For example, an event may comprise a first measurement condition relating to RSRP and a second measurement condition related to RSRQ and both the first and the second measurement conditions are to be fulfilled for reporting a measurement.

In further embodiments, the multiple trigger conditions are associated to measurement results computed based on multiple RS types. As cell measurements results may be derived, for example, based on an SS Block based reference signal, such as NR-SSS and/or NR-PSSS and/or NR-DeModulation Reference Signal (NR-DMRS) for the Physical Broadcast CHannel (PBCH) or CSI-RS(s) in NR, the triggering rules may be based on one or more of the following:

Cell-level RSRP derived from SS Block AND Cell-level RSRP derived from CSI-RS(s)
  Cell-level RSRQ derived from SS Block AND Cell-level RSRQ derived from CSI-RS(s)
  Cell-level RSRP derived from SS Block AND Cell-level RSRQ derived from CSI-RS(s)
  Cell-level RSRQ derived from SS Block AND Cell-level RSRP derived from CSI-RS(s)

Note: RSRP and RSRQ are used as examples although these embodiments are also applicable to any quantity related to cell coverage or quality e.g. SINR.

In other words, a measurement report may be sent if a first measurement condition related to a measurement performed based on a first reference signal is fulfilled, and also a second measurement condition related to a measurement performed based on a second reference signal is fulfilled.

In yet further embodiments, the multiple trigger conditions are associated to cell level measurement results and beam level measurement information, which can also be measurement results. Events may be triggered based on the cell measurement results of serving and/or neighbor cell combined with one or a combination of the following beam level based triggering conditions:

Number of "good" beams of serving and neighbor cells in addition to cell measurement results triggering, i.e.:
  A1-like event, e.g. as defined in said 3GPP TS 36.331 V14.3.0 (2017-06), is triggered if number of "good" beams in serving cell is higher and/or lower than a threshold;
  A2-like event, e.g. as defined in said 3GPP TS 36.331 V14.3.0 (2017-06), is triggered if number of "good" beams in serving cell is lower and/or higher than a threshold;
  A3-like event, e.g. as defined in 3GPP TS 36.331 V14.3.0 (2017-06), is triggered if number of "good" beams of neighbor cell becomes offset better than the number of "good" beams of the PCell/PSCell.
  A4-like event, e.g. as defined in 3GPP TS 36.331 V14.3.0 (2017-06), is triggered if number of "good" beams in neighbor cell lower and/or higher than a threshold;
  A5-like event, e.g. as defined in 3GPP TS 36.331 V14.3.0 (2017-06), is triggered if number of "good" beams in PCell/PScell becomes lower than a threshold-3 and number of "good" beams in neighbor becomes better than threshold-4;
  A6-like event, e.g. as defined in 3GPP TS 36.331 V14.3.0 (2017-06), is triggered if number of "good" beams in neighbor cell becomes offset better in terms of number of good beams than SCell;—Measurement result(s) of "good" beams of serving and neighbor cells in addition to cell measurement results triggering, i.e.:
  A1-like event is triggered if measurement result of the "best" beam in serving cell is higher than a threshold;
  A1-like event is triggered if measurement result of the "best" beam in serving cell is lower than a threshold;
  A1': is triggered if Cell quality>th1 AND if measurement result of the "best" beam in serving cell is higher than a threshold;

A1": Cell quality>th1 AND if measurement result of the "best" beam in serving cell is lower than a threshold;

A2-like event is triggered if measurement result of the "best" beam in serving cell is lower or higher than a threshold;

A3-like event is triggered if measurement result of the "best" beam of neighbor cell becomes offset better than the measurement result of the "best" beam of the PCell/PSCell.

A4-like event is triggered if measurement result of the "best" beam of neighbor cell is lower or higher than a threshold;

A5-like event is triggered if measurement result of the "best" beam in PCell/PScell becomes lower than a threshold-3 and if measurement result of the "best" beam in neighbor becomes better than a threshold-4;

A6-like event is triggered if number of "good" beams in neighbor cell becomes offset better in terms of number of good beams than SCell;

Event is triggered or an additional measurement report is transmitted if the best beam has changed or the number of beams changed.

Note: The term "good" beams above may refer to any one of the following alternatives:

All detectable beams;

All beams above an absolute threshold, which threshold may be configurable;

The beam with the highest measurement value and all the remaining ones above an absolute threshold;

All the beams within a relative threshold from the beam with the highest value, where the relative threshold may be configurable;

Note: The term "best" beam above may refer to any one of the following definitions:

The beam associated to a given cell and e.g. indicated by and/or thanks to a time index in a Physical Broadcast Channel (PBCH) that is beamformed and can be considered to be so in a broadcasted manner. Each beam may be indicated by a different time index that can be beam swept and/or by a SS Block index, where each SSB Block index may indicate a DL beam that is being transmitted. The beam may be having the highest measurement result, e.g. a power based measurement and/or a quality based measurement. In this context, the SSB may be considered to be or correspond to a set of reference signals that are beamformed and beam swept.

Notice that could either be based on SS Block or CSI-RS;

Above, combined conditions have been described as applicable for the triggering of an entering condition of an event. Another possibility is to have the rule as a condition to trigger sub-sequent reports of the events, such as for event-triggered periodical events. In other words, although the triggering of the first event may be based on a single condition, the reporting of subsequent periodic events after the triggering may be controlled by additional conditions.

In that case, conditions could be based on the change of the condition that has triggered the previous report. For example, if the wireless communication device 130 reports triggered cells and layer 3 (L3) filtered beam measurements for a certain set of beams and, e.g., the best beam for at least one of the reported cell(s) has changed, the wireless communication device 130 may send a measurement report in the predefined period, otherwise not. The change of best beam may be one criteria for that, but there can also be additional ones e.g. change in the number of good beams and a positive and/or negative change.

This makes it possible for the wireless communication network 100 to control the triggering conditions for handover in a different way than what is possible by the prior art technology. Handover may thereby be more accurate and more flexible.

Advantages and benefits of embodiments herein include e.g.:

Reduced RRC signaling. This since it is possible to combine several measurements into one and extra measurement reports can be avoided.

Reduced UE battery consumption due to less measurement reporting

More reliable handover decisions since decisions can be made based on more accurate measurement reports considering both trigger quantities.

More efficient mobility handling mechanism in network nodes, e.g. a eNB or gNB, that may require less memory and processing.

Improved UE and network performance. A mobility decision based on multiple trigger quantities in handover source and target ensure proper radio condition after handover which potentially improves UE and/or network performance in terms of throughput and capacity and retainability, e.g. drop rate.

Figure 2:
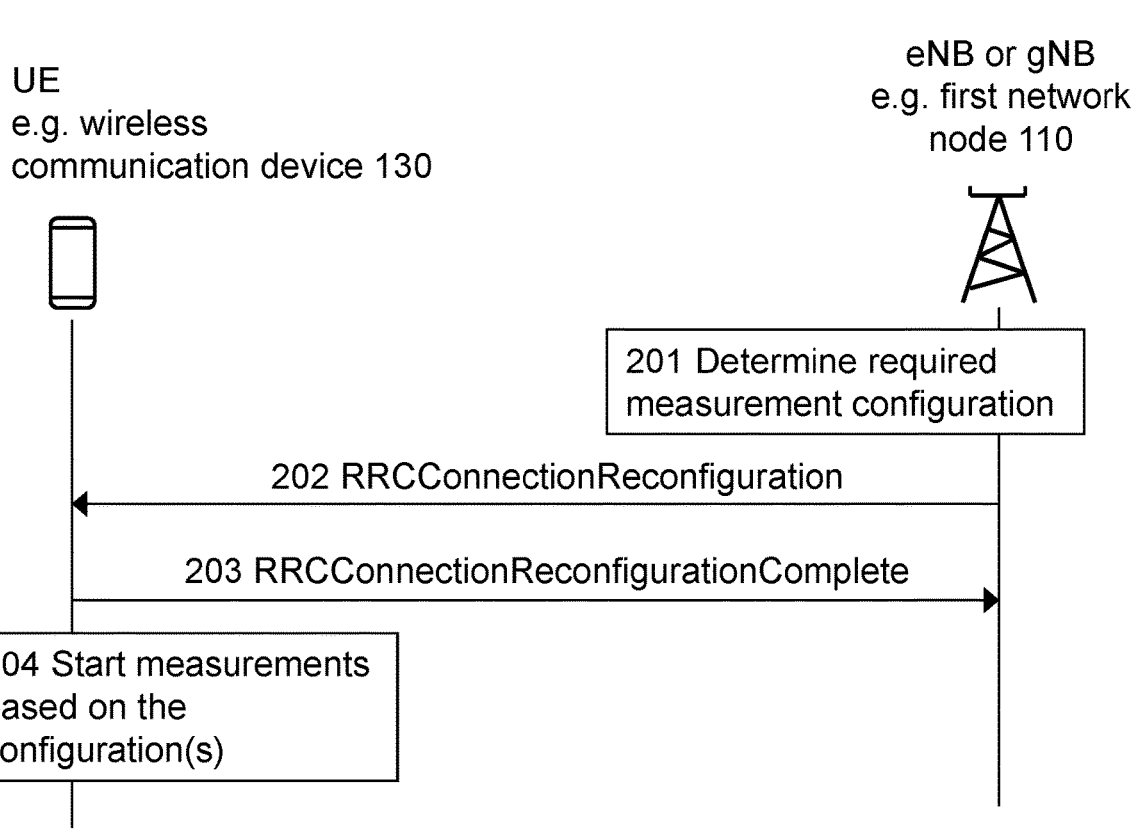
FIG. 2 is a combined signalling diagram and flowchart that shows signaling relating to some embodiment herein.

FIG. 2 is a combined signalling diagram and flowchart that shows signaling involved when the radio network, for example a serving eNB or gNB, configures UE measurements through dedicated signaling using a RRCConnectionReconfiguration message. The RRCConnectionReconfiguration message may contain a ReportConfig Information element (IE), such as above or updated based on embodiments herein, e.g. for EUTRAN or NR or any other RAT. At least in EUTRAN it is also possible to configure the measurements via RRCConnectionResume message, although not shown in the figure. For NR it was not decided which RRC message(s) should be used to provide the measurement configuration to the UE.

Embodiments herein are not supposed to, or require change of, the signaling sequence shown in the figure but may involve an update of the Information Element (IE) ReportConfigEUTRA contents to accomplish a corresponding IE for NR, e.g. when defining new IE ReportConfigGUTRA and other report config IEs that may med defined in versions of the NR specification 3GPP 38.331 following said version V0.0.4.

As shown, in an action 201 the eNB or gNB may determine a required measurement configuration, including e.g. report configuration. The enB may then send and the UE may receive the configuration, that may be ordered, in an action 202. When the configuration is completed the UE may send a RRCConnectionREconfigurationComplete message in an action 203 in return to the network, e.g. said eNB or gNB. Thereafter, in an action 204, the UE may perform event measurements accordingly, i.e. based on the received configuration, and e.g. considering the trigger quantity configuration.

In the prior art solutions, to configure for example an event A5 measurement if e.g. PCell, or a serving cell, such as the first cell 112, becomes worse than threshold1 and a neighbor cell becomes better than threshold2, there are the following two limitations:

There is only one trigger quantity defined per event. This implicitly means that Threshold 1 and threshold 2 shall be of the same kind, i.e. either RSRP, RSRQ or SINR.

It is not possible to configure multiple trigger quantities (RSRP and/or RSRQ and/or SINR) on source and neighbor measurements in the same event.

In an example scenario, a UE, e.g. the wireless communication device 130, may have encountered poor coverage in its serving cell, e.g. the first cell 112. The radio network, in this example the serving eNB, e.g. the first network node 110, configures measurements to the UE to evaluate RSRP, RSRQ and/or SINR of signals received by the UE from neighbor eNB(s) serving neighbor cells, e.g. the second network node 120 serving the second cell 122. To make sure that a target neighbor cell, e.g. the second cell 122, is good enough from RSRP, RSRQ and SINR aspects, the eNB has to configure a measurement with SINR as trigger quantity with report quantity set to all. The received UE measurement reports fulfilling SINR are post processed in the eNB to check whether RSRP and RSRQ condition for the potential target cell are also good enough. If not, the measurement report is ignored. This may lead to many wasted measurement reports as they do not lead to any mobility action. This also implies wasted eNB resources and additional UE battery consumption.

These problems could have been avoided by letting the UE send the measurement report only when it has fulfilled all the required conditions, e.g. conditions for at least two of RSRP, RSRQ and SINR.

The same scenario is valid also for NR measurements in the NR radio access network, that may be referred to as NG-RAN, and also IRAT measurements from NG-RAN to EUTRAN or any other RAT. Note that the NR radio access network previously may have been referred to as GUTRAN although NG-RAN now is more commonly used term.

In addition, Radio Resource Management (RRM) measurements in NR have some differences compared to LTE, such as the fact that cell quality for event triggering can either be based on CSI-RS or NR-SS. There are two ways to configure event measurements based on RS type:
Limit each event to one RS type
Allow combined RS per event When performing a mobility based on CSI-RS condition, it is also typically important to make sure that NR-SS coverage is good enough in the target cell. This could be achieved by two separate events, for example an A3 event based on CSI-RS and an A4 event based on NR-SS. However this may lead to a lot of unnecessary measurement reports similar to the previous example. A better solution would be to allow a single event to consider both RS-types.

Considering both multiple trigger quantities and different RS types, in some embodiments, new report configurations for GUTRAN allow:

Per threshold related to entering condition, to configure RS type, e.g. NR-SS, CSI-RS.

Per threshold related to entering condition, to configure multiple trigger quantities.

This could be extended for the other events, where a triggerQuantity1 may be defined to be valid for:
a1-Threshold
a2-Threshold
a3-Offset
a5-Threshold1 (e.g. as in the first example of Table 2 below)

A triggerQuantity2 may be defined to be valid for:
a4-Threshold
a6-Offset
a5-Threshold2 (e.g. as in the first example of Table 2 below)

TABLE 2

First example relating to a configuration for event A5

| eventA5: | |
| --- | --- |
| a5-Threshold1 | threshold-RSRP, threshold-RSRQ, threshold-SINR |
| a5-Threshold2 | threshold-RSRP, threshold-RSRQ, threshold-SINR |
| TriggerConfig1: SEQUENCE{ | |
| RSType1 | ENUMERATED {ss, csi-rs} |
| triggerQuantity1 | ENUMERATED {single, double, triple} |
| } | |
| TriggerConfig2: SEQUENCE{ | |
| RSType2 | ENUMERATED {ss, csi-rs} |
| triggerQuantity2 | ENUMERATED {single, double, triple} |
| } | |
| singleTrigger::= | ENUMERATED {rsrp, rsrq, sinr} |
| doubleTrigger::= | ENUMERATED {rsrpANDrsrq, rsrpORrsrq, rsrpANDsinr, rsrpORsinr, rsrqANDsinr, rsrqORsinr } |
| tripleTrigger::= | ENUMERATED {rsrpANDrsrqANDsinr, rsrpORrsrqORsinr , rsrpANDrsrqORsinr, rsrpORrsrqANDsinr } |

The RS type per trigger quantity may either be NR-SS or CSI-RS. Note that in the present disclosure A1 and a1 generally refer to the same event, in other words, whether capital or small letter is used is of no significance.

In some embodiments, new report configurations for GUTRA allow also for combined RS type per entering condition. Assume e.g. that a mobility is desired when CSI-RS RSRP is lower than a threshold in source and either RSRP or RSRQ for the NR-SS is also lower than specified thresholds in source cell, i.e. the following entering condition should be satisfied:
CSI-RS rsrp<csi-rs-threshold-RSRP AND ((NR-SS rsrq<ss-threshold-RSRQ) OR (NR-SS rsrp<ss-threshold-RSRP))

Table 3 below is a second example relating to a configuration for event A5 and that takes this into account, thus shows how such configuration for GUTRAN can be implemented.

TABLE 3

Second example relating to a configuration for event A5

```
eventA5:
    a5-Threshold1           ss-threshold-RSRP, ss-threshold-RSRQ, ss-threshold-SINR,
                            csi-rs-threshold-RSRP, csi-rs-threshold-RSRQ, csi-rs-threshold-SINR
    a5-Threshold2           ss-threshold-RSRP, ss-threshold-RSRQ, ss-threshold-SINR,
                            csi-rs-threshold-RSRP, csi-rs-threshold-RSRQ, csi-rs-threshold-SINR
TriggerConfig1:             SEQUENCE{
    RSType1                         ENUMERATED {ss, csi-rs, ssANDcsi-rs, ssORcsi-rs }
    triggerQuantity1                ENUMERATED {ss-single, ss-double, ss-triple,
                                    csi-rs-single, csi-rs-double, csi-rs-triple }
}
TriggerConfig2:             SEQUENCE{
    RSType2                         ENUMERATED { ss, csi-rs, ssANDcsi-rs, ssORcsi-rs }
    triggerQuantity2                ENUMERATED { ss-single, ss-double, ss-triple,
                                    csi-rs-single, csi-rs-double, csi-rs-triple }
}
singleTrigger::=    ENUMERATED {rsrp, rsrq, sinr}
doubleTrigger::=    ENUMERATED {rsrpANDrsrq, rsrpORrsrq, rsrpANDsinr, rsrpORsinr,
                    rsrqANDsinr, rsrqORsinr }
tripleTrigger::=    ENUMERATED {rsrpANDrsrqANDsinr, rsrpORrsrqORsinr }
```

The required thresholds should be configured for each RS type and quantity. In TriggerConfig the RS type may be configured whether one or both types are desired, together with the logic between them. Per RS type, then the trigger quantity is defined, whether one quantity should be considered or multiple quantities.

This could be extended, and thus used, also for the other events, where triggerQuantity1 e.g. may be defined to be valid for:
  a1-Threshold
  a2-Threshold
  a3-Offset
  a5-Threshold1 (e.g. as in the second example of Table 3 above)

Additionally, triggerQuantity2 may be defined to be valid for:
  a4-Threshold
  a6-Offset
  a5-Threshold2 (e.g. as in the second example of Table 3 above)

Note that simplifications may be made to the proposed and exemplified report configurations herein, for example limiting the trigger quantities or RS types to be combined.

Note that the examples herein are intended to indicate the presence of and exemplify some parameters. The actual format, names and location within an actual message may of course be different than in the shown examples.

Embodiments may e.g.be used and are valid for both GUTRAN, i.e. for NR, and EUTRAN, i.e. for LTE, and both regarding intra and/or inter frequency and IRAT measurement events.

As a further example related to EUTRAN and implementation in such context, consider IRAT measurement required before EUTRAN-NR Dual Connectivity (EN-DC) setup. If it is desired only to setup EN-DC when LTE is not optimal on its own, a B2 measurements on NR with multiple trigger quantity and RS type, as mentioned below, may be beneficial and may be described by:
  (LTE rsrp<B2-Threshold1-RSRP-crs OR LTE rsrq<B2-Threshold1-RSRQ-crs), i.e. based on "PCell becomes worse than a threshold1"
  AND
  (NR rsrp>B2-Threshold2-RSRP-ss AND NR rsrq>B2-Threshold2-RSRQ-ss, i.e. based on "Inter RAT neighbor becomes better than a threshold2"

One way to implement such configuration possibility may be similar to the earlier examples with e.g. the following RS type and Trigger quantity type:
  RSType: LTE CRS, LTE CSI-RS, NR SS, NR CSI-RS
  triggerQuantity options: LTE RSRP, RSRQ, SINR, NR RSRP, NR RSRQ, NR SINR.

In some other embodiments, assuming that s-Measure in the IE is also configurable per quantity and RS-Type, the joint RS-Type and triggerQuantity definition proposed in embodiments herein, may be extended to be valid for s-Measure conditions as well. For example, for a given reportConfig A5, assuming ssANDcsi-rs as a desired RS type combination for threshold 1 and rsrpORsinr as a desired trigger combination for threshold 1, the same could be also valid for s-Measure application. This means that the UE does not need to perform the inter frequency measurement unless both NR-SS and CSI-RS has either lower RSRP or SINR than the corresponding configured s-Measure thresholds, for example s-MeasureRSRP-ss and s-MeasureSINR-csi-rs, which may be configured in measObject or reportConfig IEs or a combination of both.

Figure 3:
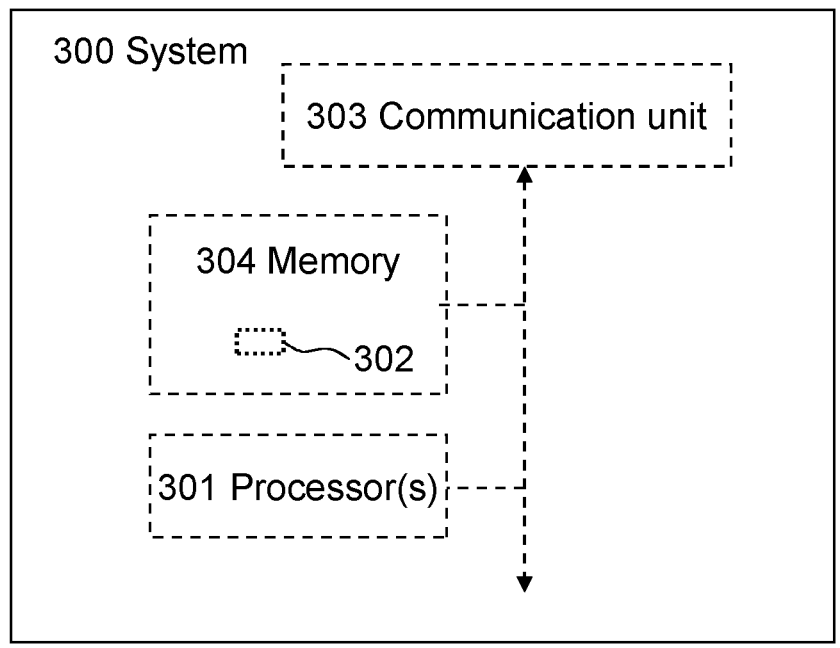
FIG. 3 is a schematic block diagram of a system relating to some embodiments herein.

FIG. 3 is a schematic block diagram of a system 300 that may be provided to perform methods and actions herein.

The system 300 may be a network node of the wireless communication network 100, such as the first network node 110 or second network node 120, which may be a network node providing radio coverage in a cell, e.g. an eNB or gNB. Alternatively, the system may be any other network node of the wireless communication system 100, such as a node further away from the wireless communication device 130, e.g. a node in the core network or a node in the radio access network, such as another network node providing radio coverage in a cell, a Radio Network Controller (RNC), a Mobility Management Entity (MME), or similar. In this alternative, the network node corresponding to the system 300, e.g. the first network node 110, may be arranged to receive instructions related to measurements by the wireless communication device 130, such as UE measurements, from said other network node and communicate the instructions in the message to the wireless communication device 130. Alternatively, the system 300 may be a group of network nodes, wherein the functionality of the system is spread out over different physical, or virtual, nodes of the wireless communication network 100. The latter may be called a cloud implementation, which also may involve nodes outside the actual wireless communication network 100. Details of the system 300 and how it may be configured to perform embodiments herein are further discussed separately below.

Figure 4:
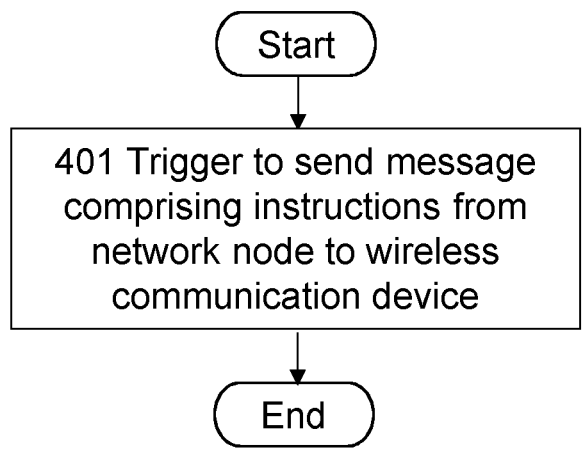
FIG. 4 is a flowchart schematically illustrating embodiments of a first method that may be performed by the system.

FIG. 4 is a flowchart schematically illustrating embodiments of a first method. The first method is to be performed by a system, e.g. the system 300, of a wireless communication network, e.g. the wireless communication network 100. The wireless communication network comprises a first network node, e.g. the first network node 110, arranged for wireless communication with a wireless communication device, e.g. the wireless communication device 130.

The first method comprises the following action.

Action 401

The system 300 triggers sending of a message from the first network node 110 to the wireless communication device 130, e.g. UE. The message comprising instructions related to measurements, e.g. UE measurements, by the wireless communication device 130 on a signal received by the wireless communication device 130 from a network node, e.g. the first network node 110 or the second network node 120, of the wireless communication network 100. The instructions comprise a first measurement condition and a second measurement condition and that both the first measurement condition and the second measurement condition have to be fulfilled for the wireless communication device 130 to report at least one of the UE measurements to the wireless communication network 100. That is, the wireless communication device 130 may by this be instructed, or informed, about the first measurement condition and the second measurement condition and that both have to be fulfilled for the wireless communication device 130 to report at least one of the UE measurements to the wireless communication network 100.

As may be realized, the message and instructions may thus correspond or relate, such as comprise or be comprised, in a reportConfig IE, or similar, and may define measuring events and more than one triggering quantity for, or per, each measurement event. The triggering quantities may correspond to the measurement conditions.

Thanks to this and embodiments herein, the system 300 and thus the wireless communication network 100 are enabled to instruct the wireless communication device 130 to take two or even more measurement conditions into consideration when determining whether to send, such as report, one or more measurements to the network node. As has been explained in further detail above, it thereby e.g. becomes possible to determine with greater precision whether a measurement is of value for the network node, when e.g. deciding whether to perform handover of the wireless communication device 130 from the first network node 110 to the second network node 120.

Note that the network node that the wireless communication device 130, by said instructions, may be instructed to measure the signal from may be a neighbouring network node, e.g. the second network node 120, to the network node that is serving the wireless communication device 130, e.g. the first network node 110.

In some embodiments, the first measurement condition is related to a first measurement quantity, e.g. RSRP, and the second measurement condition is related to a second measurement quantity, e.g. RSRQ, different from the first measurement quantity.

Further, in some embodiments, the first measurement condition is related to a first reference signal type, e.g. an SS block based reference signal, and the second measurement condition is related to a second reference signal type different to the first reference signal type, e.g. CSI RS.

Moreover, in some embodiments, the first measurement condition is related to a cell level measurement and the second measurement condition is related to beam level measurement information, such as a beam level measurement.

Furthermore, in some embodiments, the instructions comprise instructions to report a first measurement when the first measurement condition is fulfilled and wherein the second measurement condition is a detection that the first measurement condition has changed after the first measurement was reported, which the second measurement condition then triggers reporting of a second measurement.

Referring back to FIG. 3, for the system 300, embodiments herein, such as described above in relation to FIG. 4, may be implemented through one or more processors 301 in the system 300, together with computer program code 302 for performing the functions, actions and/or methods of embodiments herein. The computer program code 302 may also be provided as a computer program product, for instance in the form of a data carrier carrying computer program code for performing embodiments herein when being loaded into the system 300. Such carrier may e.g. be in the form of a CD ROM disc. It is however feasible with also other data carriers such as a memory stick. The computer program code 302 may furthermore be provided as pure program code on a server and for downloading to the system 300. The system 300 may further comprise a communication unit 303 for communication with other nodes of the wireless communication system 100, and, in case the system is realized as a network node providing radio coverage to wireless communication devices, e.g. UEs, as mentioned above, the communication unit 303 may be arranged for wireless communication with such wireless communication devices, e.g. the wireless communication device 130. The system 300 may further comprise a memory 304 that as realized may comprise one or more memory modules. The memory 304 may, for example, be used to store applications or programs to perform said functions, actions and/or methods of embodiments herein and/or any information used by such applications or programs. The computer program code 302 may be downloaded into and/or stored on the memory 304.

Hence, the system 600 may be provided to perform methods and actions described herein, e.g. the method and action described above in relation to FIG. 4. The system 300 is thus configured to perform said first method and action thereof as described above. Therefore, the system 300 and/or said one or more processors 301 and/or the communication unit 303 may be operative, or configured, to trigger said sending of said message from the first network node 110 to the wireless communication device 130.

Figure 5:
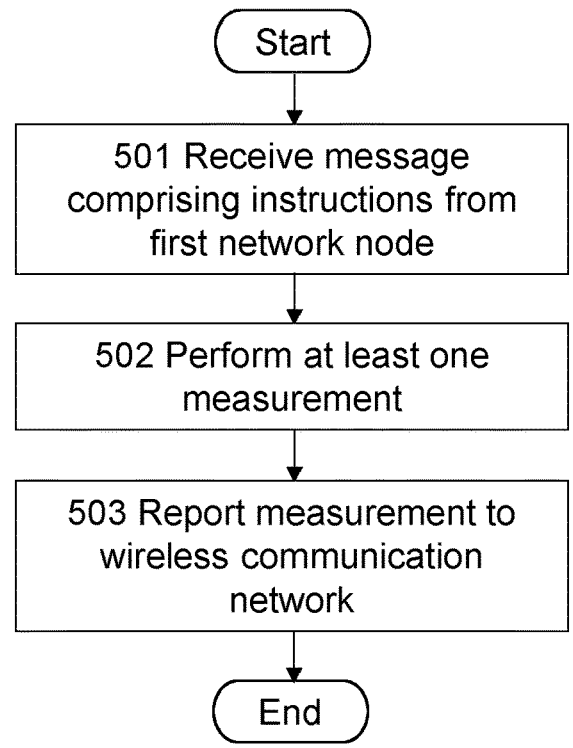
FIG. 5 is a flowchart schematically illustrating embodiments of a second method.

FIG. 5 is a flowchart schematically illustrating embodiments of a second method. The second method is to be performed by a wireless communication device, e.g. the wireless communication device 130, wirelessly connected to a first network node, e.g. the first network node 110, of a wireless communication network, e.g. the wireless communication network 100.

The second method comprises the following actions.

Action 501

The wireless communication device 130 receives a message from the first network node 110. The message comprises instructions related to at least one measurement by the wireless communication device 130 on a signal received by the wireless communication device 130 from a network node of the wireless communication network 100, e.g. the first network node 110 or the second network node 120. The instructions comprising a first measurement condition and a second measurement condition and that both the first measurement condition and the second measurement condition have to be fulfilled for the wireless communication device 130 to report the at least one measurement to the wireless communication network 100.

In some embodiments, the first measurement condition is related to a first measurement quantity, e.g. RSRP, and the second measurement condition is related to a second measurement quantity, e.g. RSRQ, different from the first measurement quantity.

Further, in some embodiments, the first measurement condition is related to a first reference signal type, e.g. an SS block based reference signal, and the second measurement condition is related to a second reference signal type different to the first reference signal type, e.g. CSI RS.

Moreover, in some embodiments, the first measurement condition is related to a cell level measurement and the second measurement condition is related to beam level measurement information, such as a beam level measurement.

Furthermore, in some embodiments, the instructions comprise instructions to report a first measurement when the first measurement condition is fulfilled and wherein the second measurement condition is a detection that the first measurement condition has changed after the first measurement was reported, which the second measurement condition then triggers reporting of a second measurement.

Action 502

The wireless communication device 130 performs the at least one measurement on the signal received from the network node.

Action 503

The wireless communication device 130 reports the at least one measurement to the wireless communication network 100 based on whether the at least one measurement fulfils the first measurement condition and the second measurement condition.

As already indicated above, the system 300 that performs the first method may be a network node, e.g. a base station of the wireless communication network 100, and may be the first network node 110. The first network node 110 may in this case receive the measurements, i.e. the reported measurements, directly from the UE. Alternatively, as also has been indicated, the system 300 that performs the first method may be another network node of the wireless communication network 100, such as a node further away from the wireless communication device 130, e.g. a node in the core network or a node in the radio access network, such as another base station. In this case, the first network node 110 may receive a triggering message from the system 300 and then, in response to this, transmits the message comprising the instructions to the wireless communication device 130. As also has been indicated above, if the system 300 that performs the first method is a group of network nodes, functionality for performing the method may be spread out over different physical or virtual, nodes of and/or in communication the wireless communication network 100. The latter may be called and/or correspond to a so called cloud implementation.

Figure 6:
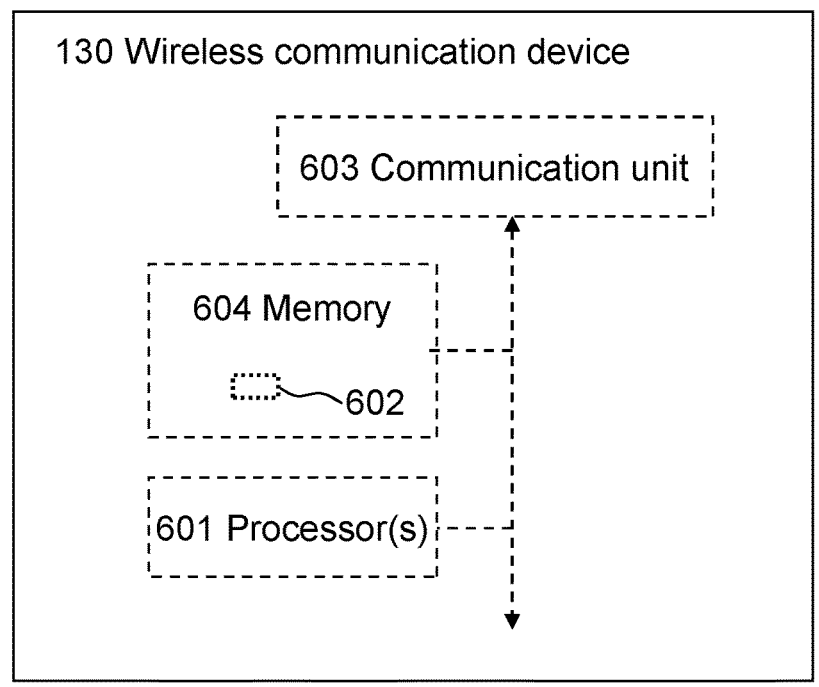
FIG. 6 is a schematic block diagram of a wireless communication device that may perform the second method.

FIG. 6 is a schematic block diagram of the wireless communication device 130 that may be provided to perform methods and actions herein.

For the wireless communication device 130, embodiments herein may be implemented through one or more processors 601 in the wireless communication device 130, together with computer program code 602 for performing the functions, actions and/or methods of embodiments herein. The computer program code 602 may also be provided as a computer program product, for instance in the form of a data carrier carrying computer program code for performing embodiments herein when being loaded into the wireless communication device 130. One such carrier may be in the form of a CD ROM disc. It is however feasible with also other data carriers such as a memory stick. The computer program code may furthermore be provided as pure program code on a server and for downloading to the wireless communication device 130. The wireless communication device 130 may further comprise a communication unit 603 for wireless communication with the first network node 110. The communication unit 603 may be a wireless receiver and transmitter or a wireless transceiver. The wireless communication device 130 may further comprise a memory 604. The memory 604 may, for example, be used to store applications or programs to perform said functions, actions and/or methods of embodiments herein and/or any information used by such applications or programs. The computer program code 602 may be downloaded into and/or stored on the memory 604.

Hence, the wireless communication device 130 may be provided to perform methods and actions described herein, e.g. the method and action described above in relation to FIG. 5. The wireless communication device 130 is thus configured to perform said second method and actions thereof as described above.

Therefore, the wireless communication device 130 and/or said one or more processors 601 and/or the communication unit 603 may be operative, or configured, to receive said message from the first network node 110.

Further, the wireless communication device 130 and/or said one or more processors 601 and/or the communication unit 603 may be operative, or configured, to perform the at least one measurement on said signal.

Moreover, the wireless communication device 130 and/or said one or more processors 601 and/or the communication unit 603 may be operative, or configured, to report said at least one measurement to the wireless communication network 100, e.g. to the first network node 110.

As already indicated, embodiments herein are applicable for cloud implementation e.g. of a eNB or gNB, as well as distributed implementation. Further, embodiments herein may be considered to be about improving measurement configurations, which may affect both network nodes, e.g. eNBs or gNBs, and wireless communication devices, e.g. UEs. Embodiments herein, and e.g. update of prior art specifications, nodes and/or devices may be specifically for mobility enhancement purposes and improved network and/or wireless device performance.

As will be readily understood by those familiar with communications design and/or electronic implementations thereof, functions, actions and/or methods described herein may be implemented using digital logic and/or one or more microcontrollers, microprocessors, or other digital hardware. In some embodiments, several or all of the various functions, methods and/or actions described herein may be implemented together, such as in a single Application-Specific Integrated Circuit (ASIC), or in two or more separate devices with appropriate hardware and/or software interfaces between them. Several of the functions, methods and/or actions may be implemented on a processor shared with other functional components of a wireless communication device, system or network node, for example.

Alternatively, several of functional elements of e.g. processing circuits may be provided through the use of dedicated hardware, while others may be provided with hardware for executing software, in association with the appropriate software or firmware. Thus, the term "processor" as may be used herein does not exclusively refer to hardware capable of executing software and may implicitly include, without limitation, Digital Signal Processor (DSP) hardware, Read-Only Memory (ROM) for storing software, Random-Access Memory (RAM) for storing software and/or program or application data, and non-volatile memory. Other hardware, conventional and/or custom, may also be included. Designers of communication receivers will appreciate the cost, performance, and maintenance trade-offs inherent in these design choices. The different actions taken by the different nodes may be implemented with different circuits.

From the above it may be seen that embodiments herein may concern a computer program product, comprising instructions which, when executed on at least one processor, e.g. the processors 303 or 603, cause the at least one processor to carry out any of the functions, methods and/or actions described. Also, some embodiments may, as described above, further comprise a carrier containing said computer program, wherein the carrier may be one of an electronic signal, optical signal, radio signal, or computer readable storage medium.

The terminology used in the detailed description of the exemplary embodiments herein and as illustrated by the accompanying drawings is not intended to be limiting of the described methods and arrangements, such as the system 300 and the wireless communication device 130.

Reference to an element in singular herein is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

In the exemplary figures, a broken line may generally signal that the feature within the broken line is optional.

Note that systems, networks, apparatuses, nodes, devices etc for implementing embodiments herein typically comprise more and/or other components than exemplified above. Additionally, operations, methods and actions of embodiments herein may be performed using any suitable logic comprising software, hardware, and/or other logic. As used in this document, "each" refers to each member of a set or each member of a subset of a set. Similarly, methods disclosed for embodiments herein may include more, fewer, or other steps than indicated. Additionally, actions may be performed in any suitable order.

Embodiments herein are not limited to the above described embodiments. Various alternatives, modifications and equivalents exists, and the above described embodiments should not be taken as limiting the scope of the present disclosure, which is defined by the appending claims.

The invention claimed is:

1. A method performed by a system of a wireless communication network, the wireless communication network comprising a first network node arranged for wireless communication with a wireless communication device, the method comprising:
    triggering sending of a message from the first network node to the wireless communication device, the message comprising instructions related to measurements by the wireless communication device on a signal received by the wireless communication device from a network node of the wireless communication network, the instructions comprising a first measurement condition and a second measurement condition and that both the first measurement condition and the second measurement condition have to be fulfilled for the wireless communication device to report at least one of the measurements to the wireless communication network;
    wherein the instructions comprise instructions to report a first measurement when the first measurement condition is fulfilled and wherein the second measurement condition is a detection that the first measurement condition has changed after the first measurement was reported which second measurement condition then triggers reporting of a second measurement.

2. The method as claimed in claim 1, wherein the first measurement condition is related to a first measurement quantity and the second measurement condition is related to a second measurement quantity different from the first measurement quantity.

3. The method as claimed in claim 1, wherein the first measurement condition is related to a first reference signal type and the second measurement condition is related to a second reference signal type different to the first reference signal type.

4. The method as claimed in claim 1, wherein the first measurement condition is related to a cell level measurement and the second measurement condition is related to beam level measurement information.

5. A system of a wireless communication network, the wireless communication network comprising a first network node arranged for wireless communication with a wireless communication device, where the system is configured to:
    trigger sending of a message from the first network node to the wireless communication device, the message comprising instructions related to measurements by the wireless communication device on a signal received by the wireless communication device from a network node of the wireless communication network, the instructions comprising a first measurement condition and a second measurement condition and that both the first measurement condition and the second measurement condition have to be fulfilled for the wireless communication device to report at least one of the measurements to the wireless communication network,
    wherein the instructions comprise instructions to report a first measurement when the first measurement condition is fulfilled and wherein the second measurement condition is a detection that the first measurement condition has changed after the first measurement was reported, which second measurement condition then triggers reporting of a second measurement.

6. The system as claimed in claim 5, wherein the first measurement condition is related to a first measurement quantity and the second measurement condition is related to a second measurement quantity different from the first measurement quantity.

7. The system as claimed in claim 5, wherein the first measurement condition is related to a first reference signal type and the second measurement condition is related to a second reference signal type different to the first reference signal type.

8. The system as claimed in claim 5, wherein the first measurement condition is related to a cell level measurement and the second measurement condition is related to beam level measurement information.

9. The system as claimed in claim 5, wherein the system is a network node of the wireless communication network.

10. A method performed by a wireless communication device wirelessly connected to a first network node of a wireless communication network, the method comprising:
receiving a message from the first network node, the message comprising instructions related to at least one measurement by the wireless communication device on a signal received by the wireless communication device from a network node of the wireless communication network, the instructions comprising a first measurement condition and a second measurement condition and that both the first measurement condition and the second measurement condition have to be fulfilled for the wireless communication device to report the at least one measurement to the wireless communication network;
performing the at least one measurement on the signal received from the network node, and
reporting the at least one measurement to the wireless communication network based on whether the at least one measurement fulfils the first measurement condition and the second measurement condition,
wherein the instructions comprise instructions to report a first measurement when the first measurement condition is fulfilled and wherein the second measurement condition is a detection that the first measurement condition has changed after the first measurement was reported which second measurement condition then triggers reporting of a second measurement.

11. The method as claimed in claim 10, wherein the first measurement condition is related to a first measurement quantity and the second measurement condition is related to a second measurement quantity different from the first measurement quantity.

12. The method as claimed in claim 10, wherein the first measurement condition is related to a first reference signal type and the second measurement condition is related to a second reference signal type different to the first reference signal type.

13. The method as claimed in claim 10, wherein the first measurement condition is related to a cell level measurement and the second measurement condition is related to beam level measurement information.

14. A wireless communication device configured to wirelessly connect to a first network node of a wireless communication network, wherein the wireless communication device is configured to:
receive a message from the first network node, the message comprising instructions related to at least one measurement by the wireless communication device on a signal received by the wireless communication device from a network node of the wireless communication network, the instructions comprising a first measurement condition and a second measurement condition and that both the first measurement condition and the second measurement condition have to be fulfilled for the wireless communication device to report the at least one measurement to the wireless communication network;
perform the at least one measurement on the signal received from the network node, and
report the at least one measurement to the wireless communication network based on whether the at least one measurement fulfils the first measurement condition and the second measurement condition,
wherein the instructions comprise instructions to report a first measurement when the first measurement condition is fulfilled and wherein the second measurement condition is a detection that the first measurement condition has changed after the first measurement was reported, which second measurement condition then triggers reporting of a second measurement.

15. The wireless communication device as claimed in claim 14, wherein the first measurement condition is related to a first measurement quantity and the second measurement condition is related to a second measurement quantity different from the first measurement quantity.

16. The wireless communication device as claimed in claim 14, wherein the first measurement condition is related to a first reference signal type and the second measurement condition is related to a second reference signal type different to the first reference signal type.

17. The wireless communication device as claimed in claim 14, wherein the first measurement condition is related to a cell level measurement and the second measurement condition is related to beam level measurement information.

* * * * *